(12) United States Patent
Toda et al.

(10) Patent No.: US 6,619,852 B2
(45) Date of Patent: Sep. 16, 2003

(54) BEARING DEVICE

(75) Inventors: Kazutoshi Toda, Osaka (JP); Masaru Deguchi, Nara (JP); Shinichirou Kashiwagi, Osaka (JP); Tadashi Mitarai, Osaka (JP); Tomohiro Ishii, Nara (JP); Daisaku Tomita, Osaka (JP)

(73) Assignee: Koyo Seiko Co., Ltd., Osaka (JP)

( * ) Notice: Subject to any disclaimer, the term of this patent is extended or adjusted under 35 U.S.C. 154(b) by 0 days.

(21) Appl. No.: 09/799,270

(22) Filed: Mar. 5, 2001

(65) Prior Publication Data

US 2001/0019639 A1 Sep. 6, 2001

(30) Foreign Application Priority Data

Mar. 3, 2000 (JP) ..................... P2000-058474
Jul. 10, 2000 (JP) ..................... P2000-207931

(51) Int. Cl.⁷ .............................................. F16C 43/00
(52) U.S. Cl. ..................... 384/537; 384/544; 301/105.1
(58) Field of Search ................... 384/537, 544, 384/513, 585, 625, 912, 913; 301/105.1, 124.1, 131; 29/898.063, 898.066

(56) References Cited

U.S. PATENT DOCUMENTS

| | | | |
|---|---|---|---|
| 4,880,281 A | * 11/1989 | Merkelbach | 301/126 |
| 5,226,738 A | 7/1993 | Valette et al. | 384/513 |
| 5,439,300 A | * 8/1995 | Hirakawa et al. | 384/492 |
| 5,536,075 A | * 7/1996 | Bertetti | 180/254 |
| 6,280,096 B1 | * 8/2001 | Miyazaki et al. | 301/108.1 |
| 6,363,799 B1 | * 4/2002 | Toda et al. | 384/448 |
| 6,398,419 B1 | * 6/2002 | Kashiwagi et al. | 384/537 |
| 6,422,758 B1 | * 7/2002 | Miyazaki et al. | 301/108.1 |

FOREIGN PATENT DOCUMENTS

EP 0854303 A2 7/1998

* cited by examiner

Primary Examiner—Pam Rodriguez
(74) Attorney, Agent, or Firm—Jordan and Hamburg LLP (57) ABSTRACT

In a bearing device in which a free end of a shaft body to which a rolling bearing is mounted is bent outward in its radial direction into a shape to be pushed against an end face of an inner ring of the rolling bearing so as to prevent the rolling bearing from falling out, a raceway surface of the inner ring of the rolling bearing is subjected to hardening treatment, and other portion of the inner ring is made of raw material which is not hardened. With this arrangement, the caulked portion formed by the caulking plastically deforms the relatively soft inner peripheral corner of the inner ring and as a result, the caulked portion and the inner peripheral corner are adhered to each other strongly.

6 Claims, 7 Drawing Sheets

BEARING DEVICE

BACKGROUND OF THE INVENTION

1. Field of the Invention

The present invention relates to a bearing device such as a hub unit for a vehicle comprising a shaft and a bearing and a rolling bearing mounted to the shaft body.

2. Description of the Related Art

Figure 7:
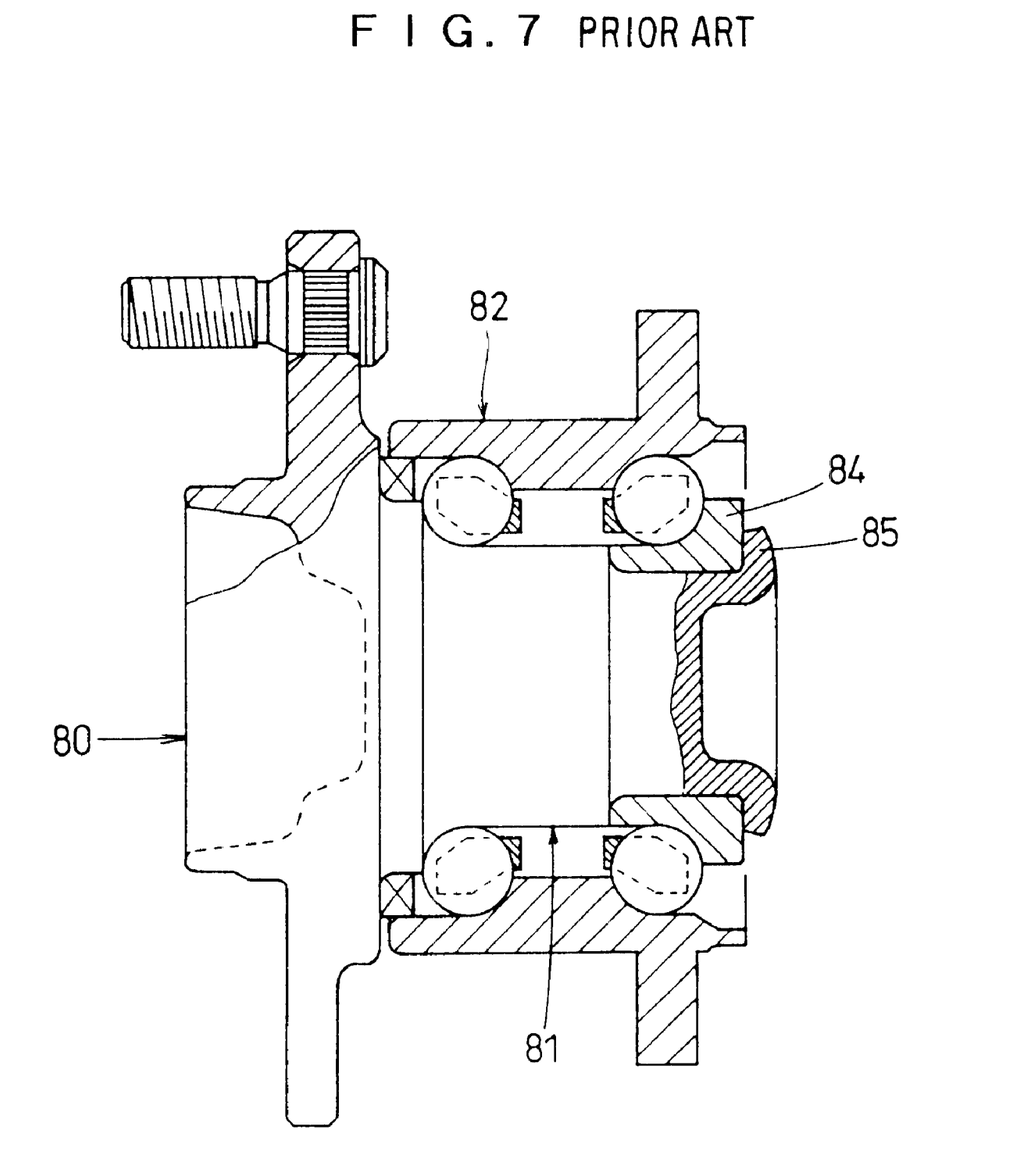
FIG. 7 is a vertical sectional side view of a conventional hub unit.

Referring to FIG. 7, in a conventional hub unit, a double row angular contact ball bearing 82 with vertex of contact angles outside of bearing is fitted and mounted around a shaft portion 81 of a hub wheel 80. A free end of the shaft portion 81 is bent outward in a radial direction by rolling-caulking. The bent caulked portion 85 pushes an outer end face of an inner ring 84 of the bearing 82. With this pushing operation, the bearing 82 is fixed to the hub wheel 80 to prevent the bearing 82 from falling out from the hub wheel 80.

Before the free end of the shaft portion 81 is caulked, the free end has a shape of a cylindrical portion. This cylindrical portion is rolling-caulked using a caulking jig. With this operation, the cylindrical portion of the shaft portion 81 is bent outward in the radial direction to form the caulked portion 85 so that the inner ring 84 is prevented from falling out.

In such a hub unit, an entire outer surface of the inner ring 84 of the bearing 82 is subjected to hardening treatment. Therefore, in order to enhance a resisting force against the falling-out phenomenon of the bearing 82, it is necessary to set a caulking load stronger.

On the other hand, if the caulking load is excessively strong, a raceway surface of the inner ring 84 is affected and there is an adverse possibility that rolling characteristics of the bearing 82 is deteriorated. Therefore, it is necessary to set the caulking load appropriately.

SUMMARY OF THE INVENTION

Therefore, it is a main object of the present invention to provide a bearing device capable of appropriately setting a caulking load such that a raceway surface of an inner ring is not affected while a falling-out resistance of a bearing can be strengthened.

Other objects, features and advantages of the present invention will be apparent from the following description.

A bearing device of the present invention comprises a shaft body and a rolling bearing mounted around the shaft body, wherein the shaft body is provided at its free end with a caulked portion. The caulked portion is bent outward in a radial direction to push an end face of an inner ring of the rolling bearing, thereby preventing the rolling bearing from falling out. A raceway surface of the inner ring of the rolling bearing is subjected to hardening treatment, and other portion of the inner ring is made of raw material which is not hardened.

According to such a structure, the portion of the inner ring of the rolling bearing other than the raceway surface can be made of raw material. Therefore, the caulked portion formed by the caulking plastically deforms the relatively soft inner peripheral corner of the miner ring and as a result, the caulked portion and the end face of the inner ring are adhered to each other strongly without adversely affecting the raceway surface of the inner ring.

In the invention, preferably, the inner ring is made of high-carbon chromium bearing steel or carbon steel for machine structural use as base material, and its raceway surface is subjected to hardening treatment by induction hardening. The raw material portion of the inner ring is prevented from being excessively deformed by a caulking load at the time of caulking so that a stable structure can be obtained.

BRIEF DESCRIPTION OF THE DRAWINGS

These and other objects as well as advantages of the invention will become clear by the following description of preferred embodiments of the invention with reference to the accompanying drawings, wherein.

In all these figures, like components are indicated by the same numerals.

DETAILED DESCRIPTION OF THE INVENTION

Hub units for a vehicle in accordance with preferred embodiments of the present invention will be explained with reference to the drawings below.

Figure 1:
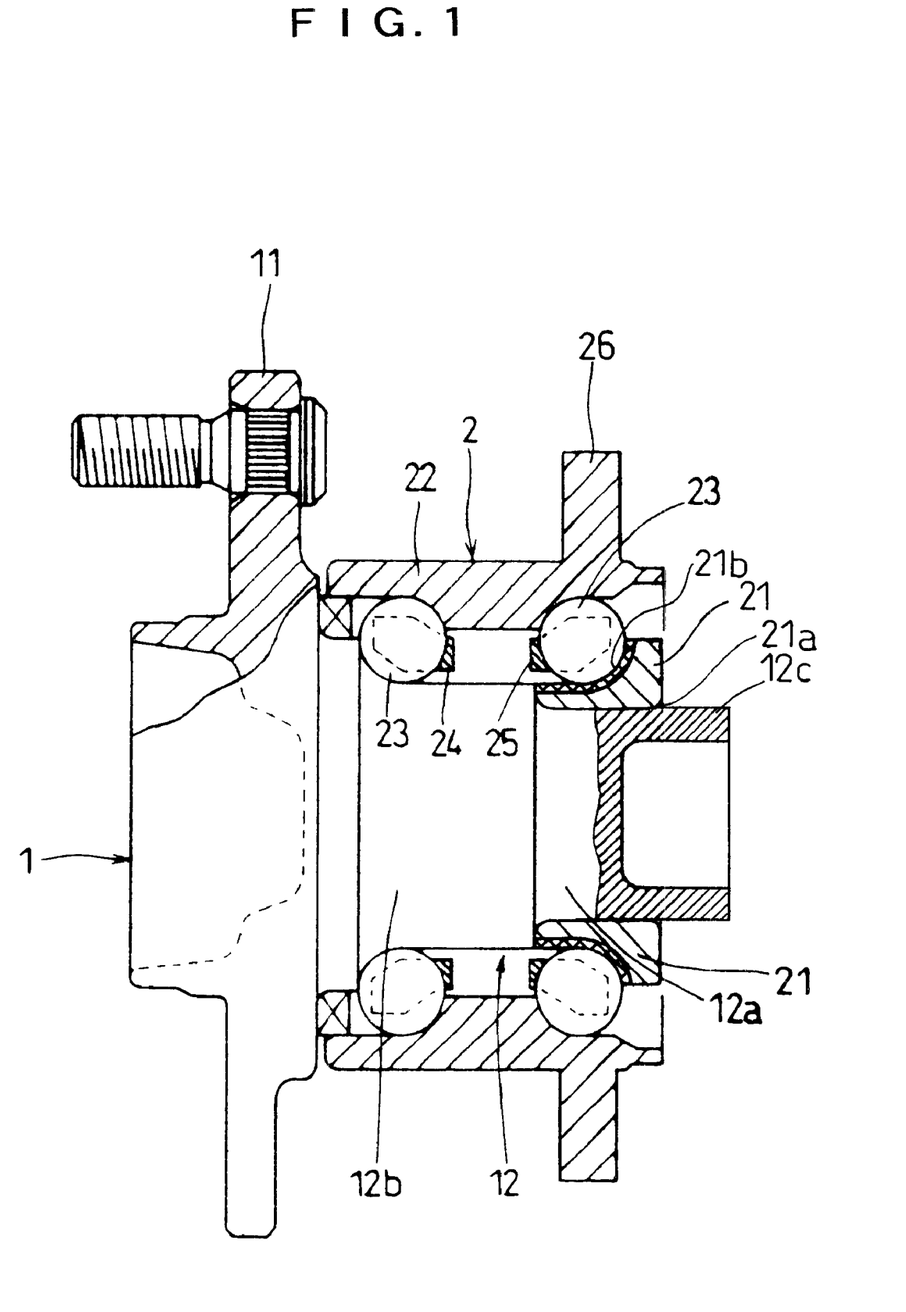
FIG. 1 is a vertical sectional side view of a hub unit before caulking according to a preferred embodiment of the present invention.
Figure 2:
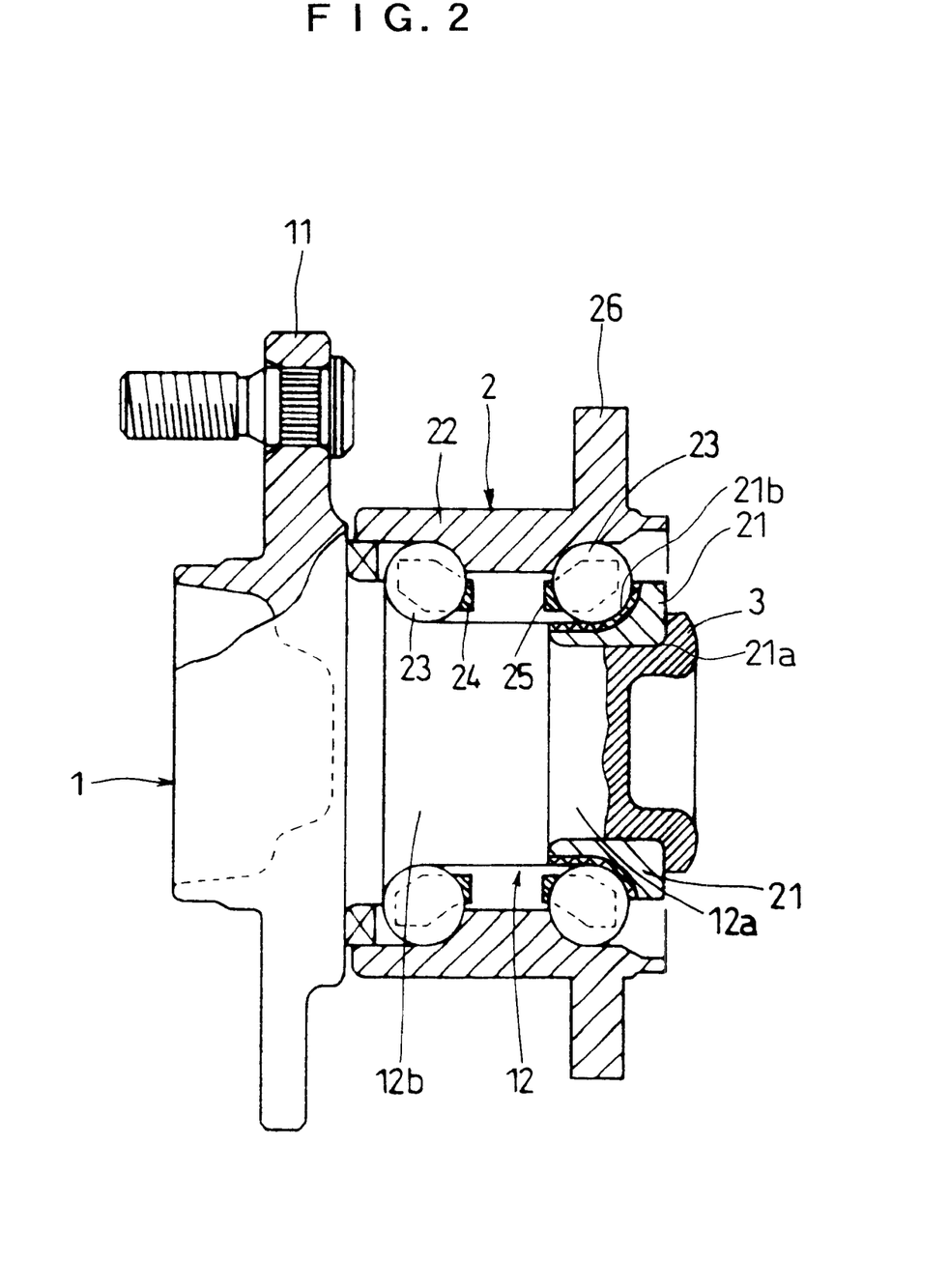
FIG. 2 corresponds to FIG. 1 and is a vertical sectional side view of the hub unit after caulking.

In a hub unit according to a preferred embodiment of the present invention shown in FIGS. 1 and 2, a numeral 1 indicates a hub wheel as a shaft body, a numeral 2 indicates a double row angular contact ball bearing with vertex of contact angles outside of bearing, and a numeral 3 indicates a caulked portion.

The hub wheel 1 includes an annular plate 11 and a shaft portion 12.

A wheel (not shown) is mounted to the annular plate 11.

The shaft portion 12 includes an outer peripheral surface 12b which is continuously formed on the annular plate 11. A portion of the outer peripheral surface 12b closer to the annular plate 11 is larger in diameter. The annular plate 11 also includes an outer peripheral surface 12a which is continuously formed on the large-diameter outer peripheral surface 12b. The outer peripheral surface 12a is smaller than the outer peripheral surface 12b in diameter. A free end of the shaft portion 12 is formed into a cylindrical portion 12c before it is caulked, and after it is caulked, the free end becomes the caulked portion 3 for fixing the bearing 2.

The bearing 2 is fitted around the shaft portion 12 of the hub wheel 1.

The bearing 2 includes a first inner ring 21 which is fitted around the small-diameter outer peripheral surface 12a of the shaft portion 12 and which has a single raceway groove, a second inner ring which comprises the large-diameter outer peripheral surface 12b of the shaft portion 12 of the hub wheel 1 and which has a single raceway groove, a single outer ring 22 having double rows of raceway grooves respectively corresponding to the raceway grooves of both the inner rings, a plurality of balls 23 arranged in two rows between the raceway grooves of both the inner rings and the raceway grooves of the outer ring 22, and two crown-like retainers 24 and 25 for respectively retaining the balls 23 in the rows.

The outer ring 22 is provided at its outer periphery with a flange 26 directed outward in the radial direction for mounting the hub unit to an axle case (not shown) or the like non-rotatably.

The inner ring 21 of the bearing 2 is made of high-carbon chromium bearing steel (JIS specification SUJ-2) or carbon steel for machine structural use as base material, and its raceway surface 21b out of its outer surface is subjected to hardening by induction hardening. Only in FIGS. 1 and 2, the hardened portion is shown with cross-hatching.

Figure 5A:
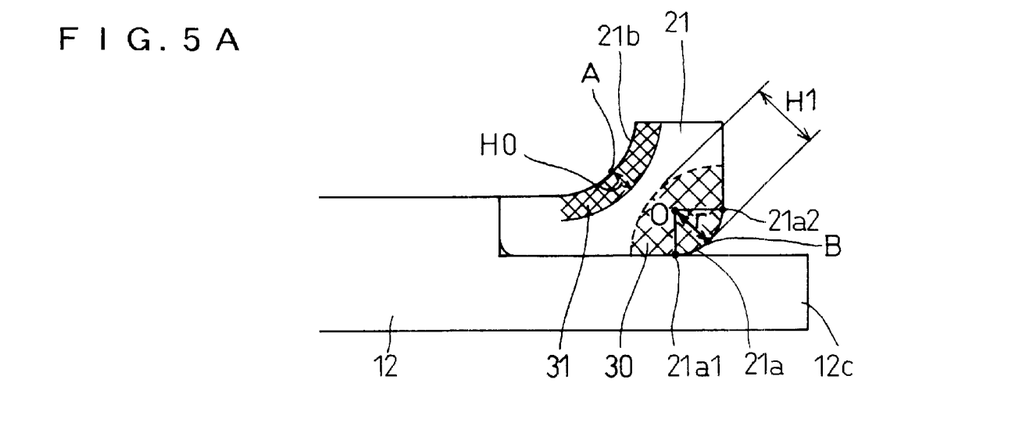
FIG. 5(A) is a side view of an essential portion of a hub unit before caulking according to another preferred embodiment of the invention.
Figure 5B:
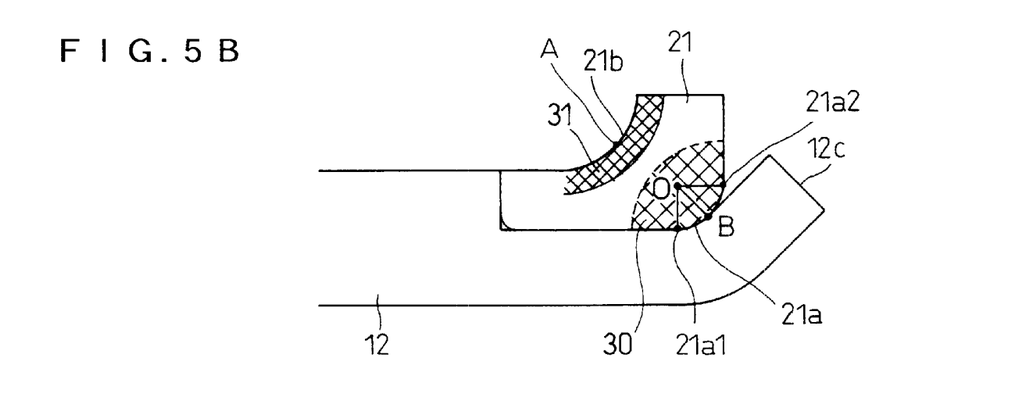
FIG. 5(B) corresponds to FIG. 5(A), and is a side view of an essential portion of a hub unit which is being caulked according to another preferred embodiment of the invention.
Figure 5C:
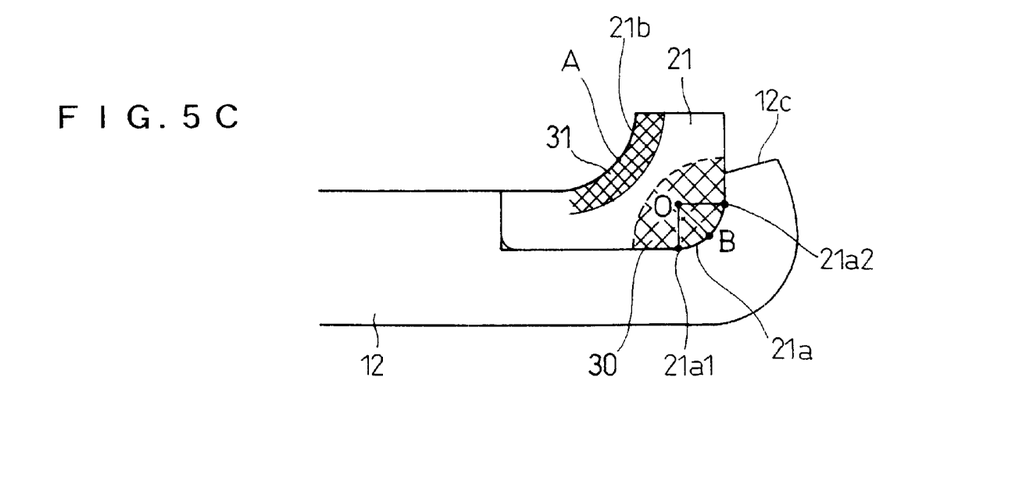
FIG. 5(C) corresponds to FIG. 5(A), and is a side view of an essential portion of a hub unit after caulking according to another preferred embodiment of the invention.

As shown in FIGS. 5(A), 5(B), 5(C) a inner peripheral corner 21a of the inner ring 21 is roundly chamfered with a radius of curvature r. The chamfering shape may be tapered shape. However, if the inner peripheral corner 21a is chamfered roundly, adhesion of the caulked portion 3 with respect to the chamfering is enhanced, and a caulking load is excellently applied.

Figure 3:
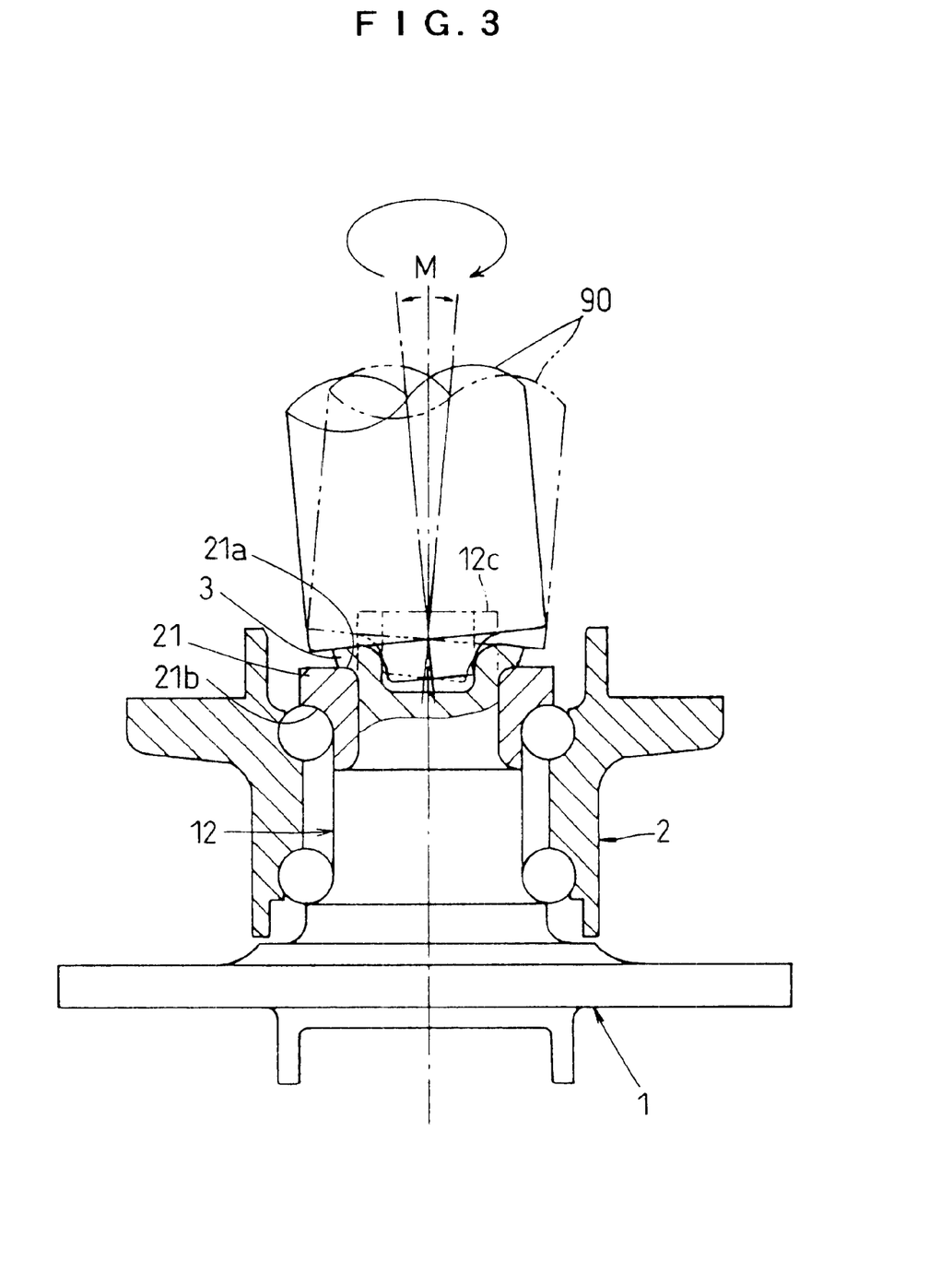
FIG. 3 is an explanatory view of rolling caulking with respect to the hub unit.

The manner for forming the caulked portion 3 will be explained with reference to FIG. 3. In FIG. 3, the free end side of the shaft portion 12 is shown such that its cylindrical portion 12c before it is caulked is shown with a phantom line, and the caulked portion 3 after it is caulked is shown with a solid line.

First, the inner ring 21 is press-fitted around the small-diameter outer peripheral surface 12a of the shaft portion 12 of the hub wheel 1. Then, the cylindrical portion 12c of the shaft portion 12 is roll-caulked using a caulking jig 90. At that time, a tip end of the caulking jig 90 is set on the cylindrical portion 12c of the shaft portion 12, and the caulking jig 90 is rolled around a perpendicular line M. With this operation, the cylindrical portion 12c is bent outward in the radial direction to form the caulked portion 3. The inner ring 21 is prevented from falling out by means of the caulked portion 3.

As described above, since the raceway surface 21b of the inner ring 21 is subjected to the hardening treatment and other portion of the inner ring 21 is left as raw material which is not hardened. Therefore, the caulked portion 3 formed by the caulking plastically deforms the relatively soft inner peripheral corner 21a of the inner ring 21 and as a result, the caulked portion 3 and the inner peripheral corner 21a are adhered to each other strongly.

Thus, even if the caulking load is not set so strong at the time of caulking, a sufficient strength can be secured, and distortion is not generated on the raceway surface 21b of the inner ring 21 in the caulking process.

As explained above, the entire outer surface of the inner ring 21 against which the caulked portion 3 pushes is not hardened, and only the raceway surface 21b of the inner ring 21 is hardened. Therefore, it is possible to strongly push the caulked portion 3 against the inner ring 21 and adhere both of them as described above, thereby the falling-out resistant force can be enhanced by the caulked portion 3, and reliability is enhanced.

Figure 4:
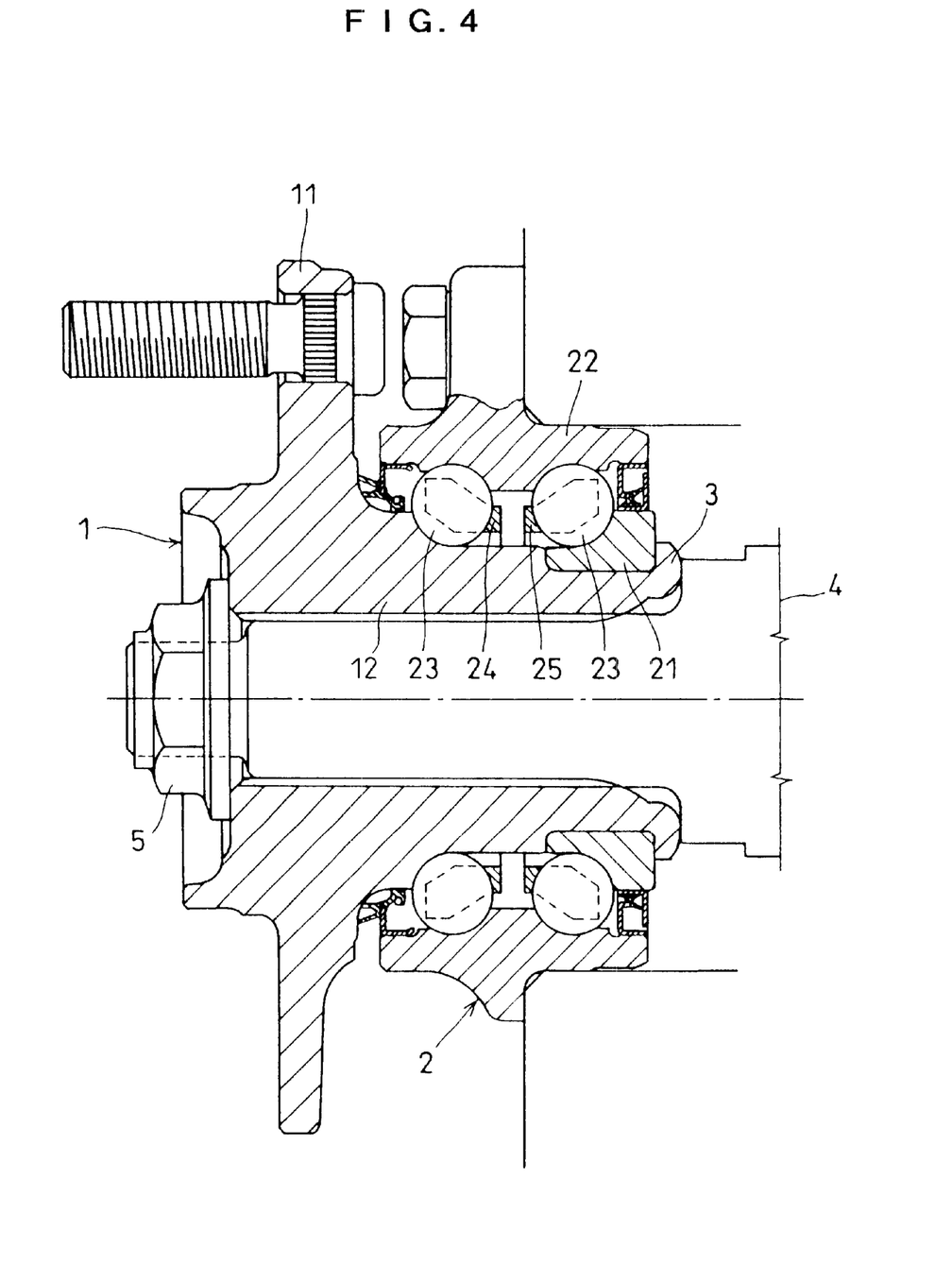
FIG. 4 is a vertical sectional side view of a hub unit according to another preferred embodiment of the invention.

Although the hub unit especially for the driven wheel for the vehicle is described as above, a hub unit for a driving wheel as shown in FIG. 4 or a guide roller of a slide door such for an automobile and other general bearing may be used. In FIG. 4, a drive shaft 4 is spline-fitted into a hollow portion of the hub wheel 1 and connected thereto using a nut 5.

Another preferred embodiment of the present invention applied to the hub unit shown in FIG. 4 will be explained with reference to FIGS. 5 and 6.

The shaft portion 12 of the hub wheel 1 in this hub unit is of a hollow structure. A shaft end of the shaft portion 12 is the cylindrical portion 12c before it is caulked.

In the inner peripheral corner 21a of the inner ring 21 of the bearing 2, a point of intersection between a line from the center O in the radial direction and the inner peripheral corner 21a is defined as a chamfering-starting point 21a1. The chamfering-starting point 21a1 is a bending-starting point when the cylindrical portion 12c is bent outward in the radial direction. A numeral 21a2 denotes a chamfering-ending point.

The cylindrical portion 12c is bent outward in the radial direction. The cylindrical portion 12c is bent from 0° as shown in FIG. 5(A) to 45° shown in FIG. 5(B), and then bent further as shown in FIG. 5(C).

At that time, when the bending angle is 45° as shown in FIG. 5(B), a peripheral region 30 of the inner peripheral corner 21a of the inner ring 21 is set such that a depth H1 from a contact point B between the cylindrical portion 12c and the inner peripheral corner 21a is equal to or greater than the radius of curvature r.

The reason why the depth H1 of the peripheral region 30 is set as above is that a range for effectively absorbing a caulking load need be wider than both the chamfering-starting point 21a1 and the chamfering-ending point 21a2.

This peripheral region 30 is a fan-like region having a radius H1 centered on the contact point B as shown with hatching. Vickers hardness Hv in this peripheral region 30 is set 400 or less at a surface layer thereof because the distortion deformation force applied at the time of caulking is plastically absorbed with this hardness. Here, the surface layer is a layer located in a depth of about 1 mm from a surface of the peripheral region 30.

The reason why the Vickers hardness of the peripheral region 30 is defined at the surface layer is that since the hardness may be lowered by induction heating and the hardness of the surface of the peripheral region 30 becomes lower than that of the inside thereof.

Here, a reference numeral 31 represents a peripheral region of the raceway surface 21b of the inner ring 21. The peripheral region 31 is a region shown with cross-hatching and has a depth H0 in a direction of contact angle from the raceway surface 21b of the inner ring 21. The Vickers hardness Hv of the peripheral region 31 is 500 or higher, and especially, the hardness of the raceway surface 21b is about 800. In this case, the depth H0 of the peripheral region 31 with respect to a maximum shearing stress depth Z0 is $H0 \geq 8 \cdot Z0$.

This will be explained with reference to FIG. 6. A vertical axis in FIG. 6 shows the Vickers hardness Hv, and a horizontal axis shows the depth of the peripheral regions 30 and 31.

Figure 6:
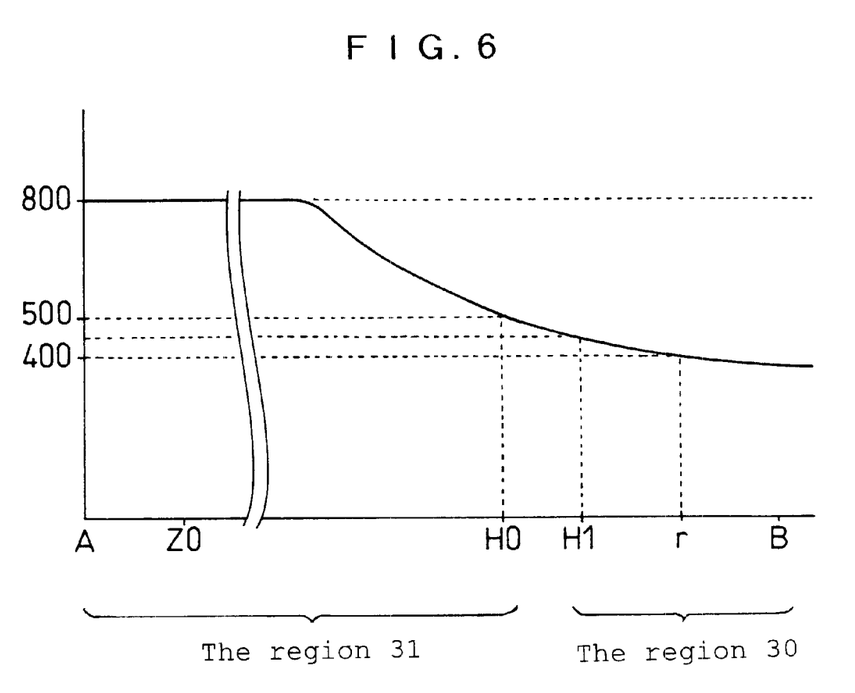
FIG. 6 is an explanatory view for FIGS. 5(A) (B) (C), and shows hardness in each peripheral region of an inner ring.

In FIG. 6, a symbol A indicates a graphical position corresponding to a depth on the raceway surface 21b in the peripheral region 31, z0 indicates a graphical position corresponding to the maximum shearing stress depth z0, and H0 indicates a graphical position corresponding to a maximum depth of the peripheral region 31 located at a position of 8 times or more of the maximum shearing stress depth z0. The Vickers hardness Hv in the peripheral region 31 is 500 or more.

The reason why the maximum depth H0 of the peripheral region 31 is set as above is that the life of the rolling bearing is affected by shearing stress. The above value of the depth H0 has been experimentally determined.

The reason why the Vickers hardness Hv of the peripheral region 30 is set 400 or less, and the Vickers hardness Hv of the peripheral region 31 is set 500 or greater is that these values are necessary in terms of life in the case of the peripheral region 31 and in terms of load absorption in the case of the peripheral region 30.

A symbol B indicates a graphical position corresponding to a depth on the inner peripheral corner 21a in the peripheral region 30, r indicates a position corresponding to a depth of radius r from the corner 21a, and H1 indicates a position corresponding to a maximum depth of the peripheral region 30.

In order to improve abrasion resistance and strength of the raceway surface 21b, such entire inner ring 21 including the peripheral regions 30 and 31 is hardened by heat treatment such as quenching, and the peripheral region 30 is low-hardened by quenching treatment such as local induction heating after the heat treatment and thus, the hardness relation shown in FIG. 6 is obtained.

According to the above-described structure, in the case of the hub unit of the present embodiment shown in FIGS. 4 to 6, the caulking load at the time of caulking of the cylindrical portion 12c of the hub wheel 1 is absorbed by plastic deformation of the peripheral region 30 which is low-hardened of the inner ring 21 and as a result, distortion is not generated in the raceway surface 21b of the inner ring 21 in the caulking process.

While there has been described what is at present considered to be preferred embodiments of this invention, it will be understood that various modifications may be made therein, and it is intended to cover in the appended claims all such modifications as fall within the true spirit and scope of this invention.

What is claimed is:

1. A bearing device, comprising:
    a shaft body; and
    a rolling bearing mounted around said shaft body, said roller bearing including an inner ring, said inner ring including a raceway surface which has been subjected to hardening treatment, another portion of said inner ring, which includes an inner peripheral corner, being left as raw material which is not hardened, said shaft body including a caulked portion at a free end thereof, said caulked portion being bent outward in a radial direction and caulked around said inner peripheral corner and over at least a portion of an end face of said inner ring adjacent to said inner peripheral corner, thereby preventing said rolling bearing from falling out.

2. The bearing device according to claim 1, wherein said inner ring is made of one of high-carbon chromium bearing steel and carbon steel for machine structural use as a base material, and said hardening treatment to which said raceway surface has been subjected includes induction hardening.

3. The bearing device according to claim 1, wherein said rolling bearing comprises:

a first inner ring fitted around an outer peripheral surface of said shaft body, said first inner ring having a first single raceway groove, an end face of said first inner ring being pushed by said caulked portion;
    a second inner ring formed by said outer peripheral surface of said shaft body and having a second single raceway groove;
    a single outer ring having two raceway grooves corresponding to said first and second single raceway grooves of said first and second inner rings;
    a plurality of balls arranged in two rows between said first and second single raceway grooves of said inner rings and said two raceway grooves of said outer ring; and
    two retainers for respectively retaining the balls in said two rows;
    said first single raceway groove of said first inner ring including said raceway surface which has been subjected to hardening treatment, and at least the inner peripheral corner of said first inner ring which is left as raw material which is not hardened.

4. The bearing device according to claim 3, wherein said first inner ring includes an inner peripheral corner which is roundly chamfered.

5. A bearing device, comprising:
    a hub wheel including an annular plate and a shaft portion, said shaft portion including an outer peripheral surface which is continuously formed on said annular plate, a first portion of said outer peripheral surface closer to said annular plate being relatively larger in diameter than other portions thereof, a second portion of said outer peripheral surface being smaller in diameter than said first portion of said outer peripheral surface; and
    a double row rolling bearing which is mounted around said shaft portion of said hub wheel, paid double row rolling bearing comprising a first inner ring fitted around said small-diameter outer periphery of said shaft portion of said hub wheel and having a first single raceway groove, a second inner ring formed by said large-diameter outer peripheral surface of said shaft portion of said hub wheel and having a second single raceway groove, a single outer ring having two raceway grooves corresponding to said first and second single raceway grooves of both said inner rings, a plurality of balls arranged in two rows between said raceway grooves of both said inner rings and said raceway grooves of said outer ring, and two crown-like retainers for respectively the balls in said two rows, a raceway surface of said first inner ring which has been subjected to hardening treatment, and another of said inner ring, which includes an inner peripheral corner, being left as raw material which is not hardened, a free end of said shaft portion of said hub wheel being provided with a caulked portion, said caulked portion being bent outward in a radial direction and caulked around said inner peripheral corner and over at least a portion of an end face of said inner ring adjacent to said inner peripheral corner, thereby preventing said rolling bearing from falling out.

6. The bearing device according to claim 5, wherein said inner ring is made of one of high-carbon chromium bearing steel and carbon steel for machine structural use as base material, and its raceway surface is subjected to hardening treatment by induction hardening.

* * * * *